(12) United States Patent
Peng et al.

(10) Patent No.: US 7,901,100 B2
(45) Date of Patent: Mar. 8, 2011

(54) BACKLIGHT MODULE UNIT AND BACKLIGHT MODULE

(75) Inventors: Ci-Guang Peng, Hsinchu (TW); Chung Peng, Hsinchu (TW); Chih-Kuang Chen, Hsinchu (TW); Pang-Hsuan Liu, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 247 days.

(21) Appl. No.: 12/115,881

(22) Filed: May 6, 2008

(65) Prior Publication Data

US 2009/0185371 A1 Jul. 23, 2009

(30) Foreign Application Priority Data

Jan. 22, 2008 (TW) .............................. 97102306 A

(51) Int. Cl.
 *F21V 7/00* (2006.01)
(52) U.S. Cl. ......... 362/97.1; 362/247; 362/297; 362/346
(58) Field of Classification Search ........ 362/97.1–97.4, 362/330, 230, 231, 235, 237, 241, 247, 342, 362/297, 346; 349/62, 66, 67
See application file for complete search history.

(56) References Cited

U.S. PATENT DOCUMENTS

| | | | | |
|---|---|---|---|---|
| 6,964,489 B2* | 11/2005 | Blume et al. | ..................... | 362/27 |
| 7,470,046 B2* | 12/2008 | Kao et al. | ..................... | 362/332 |
| 7,510,291 B2* | 3/2009 | Song et al. | ..................... | 362/97.2 |
| 7,654,687 B2* | 2/2010 | Tsai et al. | ..................... | 362/237 |
| 2006/0193148 A1 | 8/2006 | Bang | | |
| 2006/0221612 A1* | 10/2006 | Song et al. | ..................... | 362/247 |
| 2007/0002555 A1* | 1/2007 | Chang | ............................. | 362/97 |
| 2007/0024772 A1 | 2/2007 | Childers et al. | | |
| 2009/0052174 A1 | 2/2009 | Tsai et al. | | |

FOREIGN PATENT DOCUMENTS

| | | |
|---|---|---|
| CN | 101118348 | 2/2008 |
| JP | 2005-108776 | 4/2005 |

OTHER PUBLICATIONS

English language translation of abstract and pertinent parts of JP 2005-108776.
Chinese language office action dated Apr. 3, 2009.

* cited by examiner

Primary Examiner — Bao Q Truong
(74) Attorney, Agent, or Firm — Thomas, Kayden, Horstemeyer & Risley, LLP

(57) ABSTRACT

A backlight module unit and a backlight module are provided. The backlight module unit includes a first light source, a second light source, and an optical barrier. A light source interval is defined between the first light source and the second light source, while a barrier interval is defined between the optical barrier and the second light source. Because the barrier interval is substantially shorter than a half of the light source interval, the backlight module unit mixes the light evenly, and prevents the dark bands from forming due to the disposition of the optical barrier. Thereby, the backlight module that comprises the plural aforesaid backlight units will have no dark bands, mix light evenly, and be thin overall.

10 Claims, 3 Drawing Sheets

BACKLIGHT MODULE UNIT AND BACKLIGHT MODULE

This application claims priority to Taiwan Patent Application No. 097102306 filed on Jan. 22, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a backlight module unit of a backlight module, as well as the backlight module itself, and particularly relates to a backlight module unit having an appropriate interval between a light source and an optical barrier, as well as a backlight module comprising a plurality of such backlight module units.

2. Descriptions of the Related Art

As a result of technical developments, liquid crystal displays (LCDs) with low power consumption, low radiation, a light weight and slim profiles are widely used in various electronic products that require a screen, such as computers, mobile phones, televisions or the like. Compared to the conventional cathode ray tube (CRT) displays, LCDs require an additional light source to assist the imaging process. The additional light source is generally known as a backlight module.

To reduce power consumption, prolong the service life and increase the color saturation of an LCD, manufacturers have discontinued the use of cold cathode fluorescent lamps (CCFLs) in backlight modules of conventional LCDs. Instead, light-emitting diodes (LEDs), which have increased color saturation, a higher light-emitting efficiency and a longer service life, are used as a backlight light source. To mix the different colors of light rays emitted from the LEDs with various colors into a uniform white light, a variety of light mixing mechanisms have been proposed by the manufacturers.

As shown in FIG. 1, a conventional backlight module 1 comprises a plurality of LEDs 11 with different colors and a composite optical film 12. The different color light rays emitted from the LEDs 11 are mixed with each other in the space below the composite optical film 12. Because the composite optical film 12 is the only component used in the backlight module 1 to assist in light mixing, the composite optical film 12 must be located relatively far from the LEDs 11, so that the different color light rays emitted from the LEDs 11 can be mixed sufficiently in the light mixing space 10 between the composite optical film 12 and the plurality of LEDs 11 to prevent uneven color display. However, to increase the light mixing efficiency of such a light mixing structure, the light mixing space 10 has to be increased in thickness, leading to an excessively large thickness of the backlight module 1 and therefore a bigger LCD.

In view of this, it is highly desirable in the art to provide a thin backlight module that mixes light uniformly and is also free of dark bands.

SUMMARY OF THE INVENTION

One objective of this invention is to provide a backlight module unit, which mixes light uniformly and is free of dark bands attributed to the disposition of an optic barrier. The backlight module unit comprises a first light source, a second light source and a first optical barrier. The second light source is spaced apart from the first light source along a first direction to define a first light source interval therebetween. The first optical barrier is spaced apart from the second light source along the first direction to define a first barrier interval therebetween. The first barrier interval is substantially shorter than a half of the first light source interval.

Another objective of this invention is to provide a backlight module comprising a plurality of sequentially disposed backlight module units defined above. Accordingly, an LCD that uses such a backlight module will have uniform light mixing, a thin profile, and no dark bands.

With an optical barrier, the light rays emitted from a plurality of different color light sources in the backlight module of this invention can be mixed uniformly in the individual backlight module units without increasing the thickness of the backlight module. Meanwhile, by reducing the length of the first barrier interval, the first barrier interval is made to be shorter than half the first light source interval, thus eliminating the dark bands on both sides of the optical barrier.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
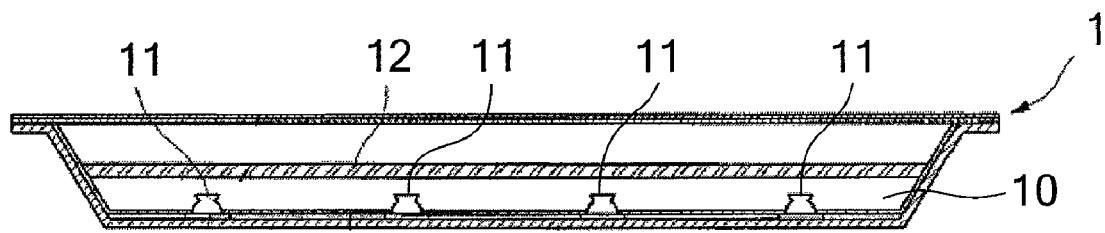
FIG. 1 illustrates a cross-sectional view of a conventional backlight module.
Figure 2:
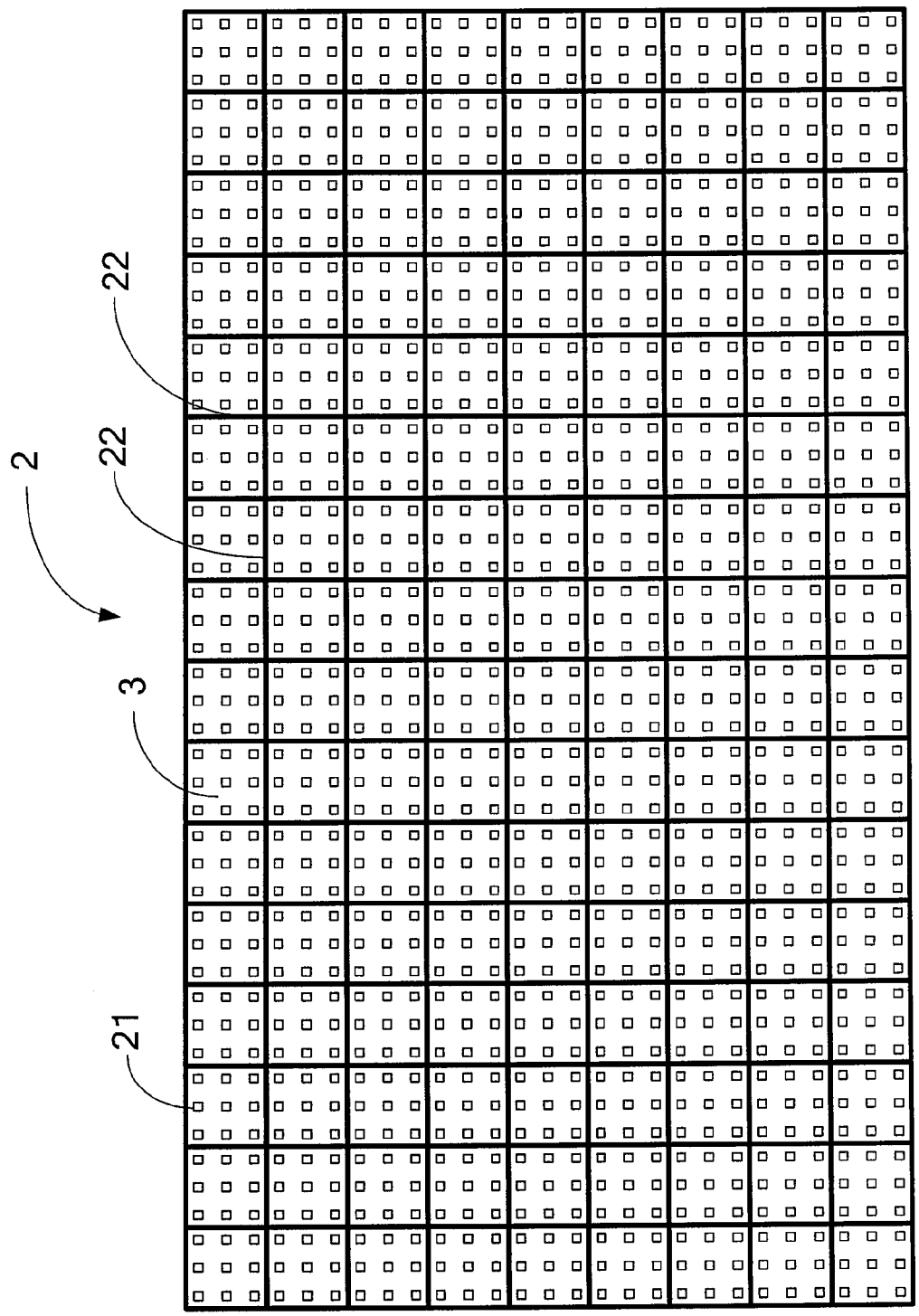
FIG. 2 illustrates a front view of an embodiment of a backlight module in accordance with this invention.

FIG. 2 depicts an embodiment of a backlight module 2 in accordance with this invention. As shown in FIG. 2, the backlight module 2, which is intended for use in LCDs or other purposes, comprises a plurality of backlight module units 3. These backlight module units 3 are arranged in an array, i.e., are sequentially disposed to form the backlight module 2. Each of the backlight module units 3 comprises a plurality of light sources 21 and a plurality of optical barriers 22, in which each of the backlight module units 3 is surrounded and defined by a number of optical barriers 22. However, due to the disposition of the optical barriers 22, the light rays emitted from the LEDs 21 will be reflected off the optical barrier 22 when impinging thereon. Consequently, these dark bands will degrade the image displaying quality on both sides of each optical barrier 22, especially at large viewing angles. For this reason, the distance between the plurality of light sources 21 and corresponding optical barriers 22 in the backlight module unit 3 should be further reduced to eliminate the dark bands on both sides of the optical barriers 22 due to the disposition of the plurality of optical barriers 22.

Figure 3:
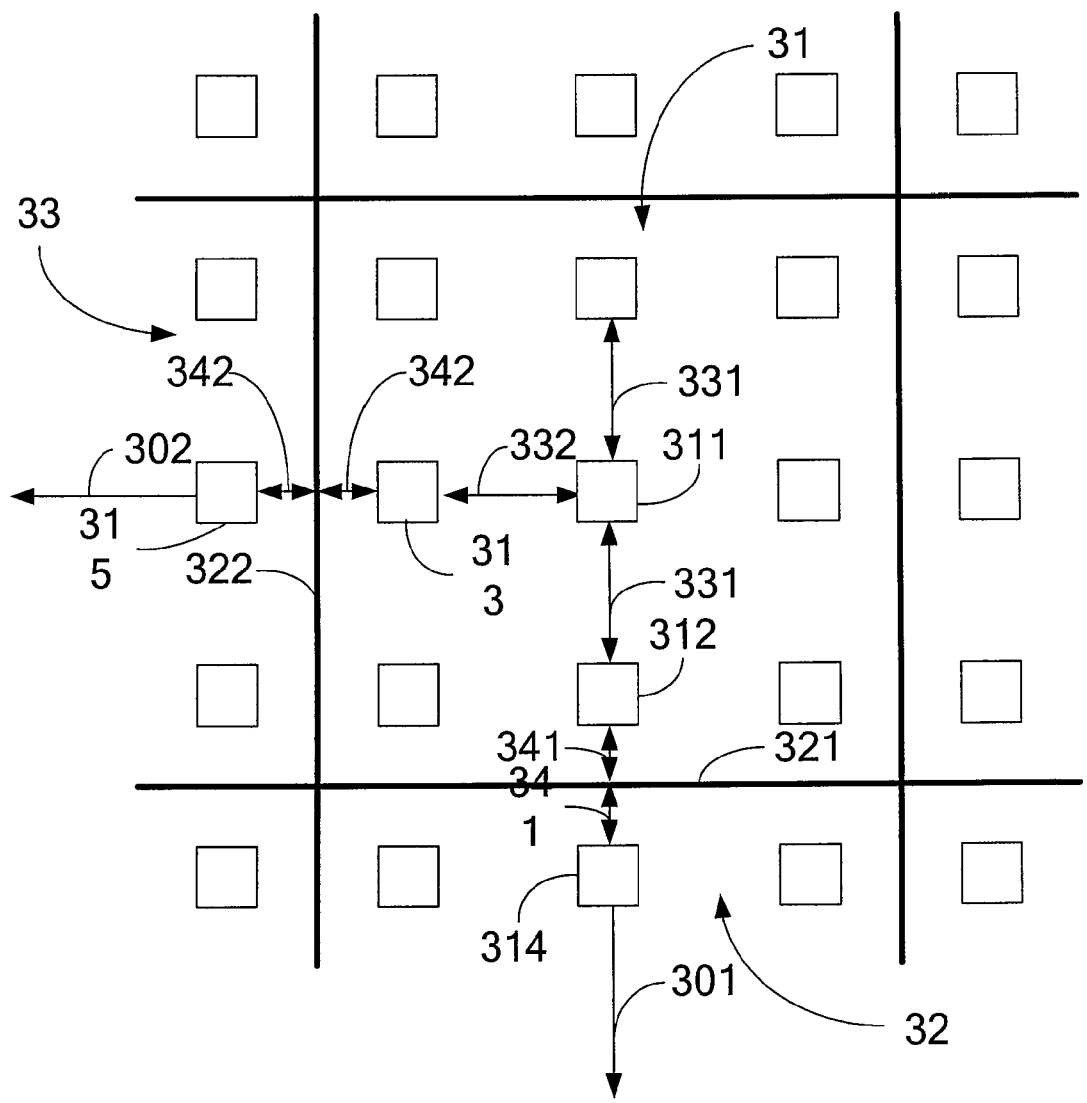
FIG. 3 illustrates a front view of an embodiment of a backlight module unit in accordance with this invention.

FIG. 3 illustrates an enlarged view of a backlight module unit 3. As shown in FIG. 3, the plurality of backlight module units 3 comprise a first backlight module unit 31, a second backlight module unit 32 and a third backlight module unit 33. The first backlight module unit 31 further comprises a first light source 311, a second light source 312, a first optical barrier 321, a third light source 313 and a second optical barrier 322. In this embodiment, the light emitting diodes (LEDs) are used for the first light source 311, the second light source 312 and the third light source 313. Among the plurality of optical barriers defining each of the backlight module units 31, 32, 33, some are parallel to the first optical barrier 321 while the others are parallel to the second optical barrier 322.

The second light source 312 and the first optical barrier 321 are sequentially disposed along a first direction 301 with respect to the first light source 311, with a first light source interval 331 formed between the first light source 311 and the second light source 312 and a first barrier interval 341 formed between the first optical barrier 321 and the second light source 312. In an embodiment of this invention, the first barrier interval 341 is substantially shorter than a half of the first light source interval 331. In the preferred embodiment, the first barrier interval 341 is 1 to 4 millimeters (mm) shorter than a half of the first light source interval 331.

The third light source 313 and the second optical barrier 322 are sequentially disposed with respect to the first light source 311 along a second direction 302 different from the first direction 301, with a second light source interval 332 formed between the third light source 313 and the first light source 311, and a second barrier interval 342 formed between the second optical barrier 322 and the third light source 313. In this embodiment, the second direction 302 is perpendicular to the first direction 301. However, this invention is not merely limited thereto, and in practical applications, the first direction 301 may not be perpendicular to the second direction 302. In this embodiment of this invention, the second barrier interval 342 is substantially shorter than a half of the second light source interval 332. In the preferred embodiment, the second barrier interval 342 is 1 to 4 millimeters (mm) shorter than a half of the second light source interval 332.

The second backlight module unit 32, which is disposed adjacent to the first backlight module unit 31 along the first direction 301, comprises a fourth light source 314. In this embodiment, the fourth light source 314 is also an LED. The fourth light source 314 is disposed along the first direction 301 with respect to the first optical barrier 321, with a barrier interval formed therebetween. This barrier interval is shorter than a half of the first light source interval 331, and in this embodiment, is equal to the first barrier interval 341.

Likewise, the third backlight module unit 33, which is disposed adjacent to the first backlight module unit 31 along the second direction 302, comprises a fifth light source 315. In this embodiment, the fifth light source 315 is also an LED. The fifth light source 315 is disposed along the second direction 302 with respect to the second optical barrier 322, with a barrier interval formed therebetween. This barrier interval is shorter than a half of the second light source interval 332, and in this embodiment, is equal to the second barrier interval 342.

As described above, each of the backlight module units is defined by the optical barriers, and the number of light sources included in each of the backlight module unit is not merely limited to what described above. Therefore, each light source disposed adjacent to an optical barrier is spaced apart from the optical barrier by the aforesaid barrier interval. The adjacent light sources are spaced apart from each other by the aforesaid light source interval. By setting the aforesaid barrier intervals to be shorter than half the length of the corresponding light source interval, the dark bands on both sides of each optical barrier due to the disposition of the optical barrier are eliminated.

In the backlight module of this invention, the backlight module units are defined by a plurality of optical barriers parallel to the first optical barrier and the second optical barrier respectively, and each backlight module unit has similar structure as described above.

It follows from the above description that the backlight module of this invention can provide uniform light mixing and eliminate the dark bands that are otherwise located on both sides of the optical barriers due to the disposition of the optical barriers. Thus the problems of an excessive thickness and non-uniform light mixing in conventional backlight modules have been overcome in this invention. Accordingly, when the backlight module of this invention is applied in various LCDs, the LCDs will be thinner with a uniform luminance.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A backlight module unit, comprising:
    a first light source;
    a second light source, spaced apart from the first light source along a first direction to define a first light source interval therebetween;
    a first optical barrier, spaced apart from the second light source along the first direction to define a first barrier interval therebetween;
    a third light source, spaced apart from the first light source along a second direction, differing from the first direction, to define a second light source interval therebetween; and
    a second optical barrier, spaced apart from the third light source along the second direction to define a second barrier interval therebetween;
    wherein the first barrier interval is substantially shorter than a half of the first light source interval, and the second barrier interval is substantially shorter than a half of the second light source interval;
    wherein the difference between the first barrier interval and a half of the first light source interval is from 1 millimeter (mm) to 4 millimeter (mm).

2. The backlight module unit as claimed in claim 1, wherein the difference between the second barrier interval and a half of the second light source interval is from 1 mm to 4 mm.

3. The backlight module unit as claimed in claim 1, further comprising a fourth light source, wherein the fourth light source is spaced apart from the first optical barrier along the first direction to define the first barrier interval therebetween.

4. The backlight module unit as claimed in claim 3, further comprising a fifth light source, wherein the fifth light source is spaced apart from the second optical barrier along the second direction to define the second barrier interval therebetween.

5. The backlight module unit as claimed in claim 1, further comprising a plurality of optical barriers parallel to the first optical barrier.

6. The backlight module unit as claimed in claim 1, further comprising a plurality of optical barriers parallel to the second optical barrier.

7. The backlight module unit as claimed in claim 1, wherein the first direction is perpendicular to the second direction.

8. The backlight module unit as claimed in claim 1, wherein the first light source and the second light source are Light-Emitting Diodes (LEDs).

9. The backlight module unit as claimed in claim 1, wherein the third light source is an LED.

10. A backlight module, comprising a plurality of the backlight module units, sequentially disposed, as claimed in claim 1.

* * * * *